United States Patent
Chen et al.

(10) Patent No.: US 8,995,087 B1
(45) Date of Patent: Mar. 31, 2015

(54) PERPENDICULAR MAGNETIC RECORDING WRITE HEAD HAVING A WRAP AROUND SHIELD

(71) Applicant: Western Digital (Fremont), LLC, Fremont, CA (US)

(72) Inventors: Yingjian Chen, Fremont, CA (US); Kyusik Shin, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/220,012

(22) Filed: Mar. 19, 2014

Related U.S. Application Data (62) Division of application No. 11/605,635, filed on Nov. 29, 2006, now Pat. No. 8,689,430.

(51) Int. Cl.
*G11B 5/187* (2006.01)
*G11B 5/127* (2006.01)
*G11B 5/11* (2006.01)

(52) U.S. Cl.
CPC .......................................... *G11B 5/11* (2013.01)
USPC .................................. 360/125.3; 360/125.03

(58) Field of Classification Search
USPC .............................. 360/125.02, 125.03, 125.3
See application file for complete search history.

(56) References Cited

U.S. PATENT DOCUMENTS

| | | | |
|---|---|---|---|
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,118,638 A | 9/2000 | Knapp et al. | |
| 6,125,018 A | 9/2000 | Takagishi et al. | |
| 6,130,779 A | 10/2000 | Carlson et al. | |
| 6,134,089 A | 10/2000 | Barr et al. | |
| 6,136,166 A | 10/2000 | Shen et al. | |
| 6,137,661 A | 10/2000 | Shi et al. | |
| 6,137,662 A | 10/2000 | Huai et al. | |
| 6,160,684 A | 12/2000 | Heist et al. | |
| 6,163,426 A | 12/2000 | Nepela et al. | |

(Continued)

*Primary Examiner* — Brian Miller (57) ABSTRACT

A perpendicular magnetic recording (PMR) head is disclosed. The PMR head includes a perpendicular magnetic recording pole having at least one side, a bottom and a top wider than the bottom. The PMR head also includes at least one side gap, at least one side shield, a to gap on the PMR pole and a top shield. The side gap(s) encapsulate the side(s) of the PMR pole, has at least one width and is between the PMR pole and the side shield(s). The to gap has a thickness such that the ratio of the width(s) to the thickness is greater than one. A portion of the top gap is between at least part of the top shield and the side shield(s).

6 Claims, 8 Drawing Sheets

(56) References Cited

U.S. PATENT DOCUMENTS

| | | |
|---|---|---|
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |

(56) References Cited

U.S. PATENT DOCUMENTS

| | | |
|---|---|---|
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,954,340 B2 * | 10/2005 | Shukh et al. ............ 360/317 |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,871 B2 * | 3/2007 | Hsu et al. ............ 360/125.03 |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,440,230 B2 * | 10/2008 | Hsu et al. ............ 360/125.3 |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,649,712 B2 * | 1/2010 | Le et al. ............ 360/125.3 |

(56) References Cited

U.S. PATENT DOCUMENTS

| | | |
|---|---|---|
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,712,206 B2 * | 5/2010 | Jiang et al. ............... 29/603.16 |
| 7,715,147 B2 * | 5/2010 | Feldbaum et al. ......... 360/125.3 |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,903,372 B2 * | 3/2011 | Lee et al. ................... 360/125.3 |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |

(56) References Cited

U.S. PATENT DOCUMENTS

| | | |
|---|---|---|
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 * | 5/2014 | Tran et al. ................. 29/603.14 |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 * | 8/2014 | Bai et al. ................. 360/125.15 |
| 8,797,692 B1 | 8/2014 | Guo et al. |
| 2005/0068669 A1 * | 3/2005 | Hsu et al. ................. 360/125 |
| 2005/0068678 A1 * | 3/2005 | Hsu et al. ................. 360/126 |
| 2006/0002020 A1 | 1/2006 | Pokhil et al. |
| 2006/0044681 A1 | 3/2006 | Le et al. |
| 2006/0044682 A1 | 3/2006 | Le et al. |
| 2006/0082924 A1 | 4/2006 | Etoh et al. |
| 2007/0268625 A1 | 11/2007 | Jiang et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

* cited by examiner

PERPENDICULAR MAGNETIC RECORDING WRITE HEAD HAVING A WRAP AROUND SHIELD

CROSS REFERENCE TO RELATED APPLICATION(S)

This application is a divisional of co-pending application Ser. No. 11/605,635 filed on Nov. 29, 2006, which is hereby incorporated by reference.

FIELD OF THE INVENTION

The present invention relates to magnetic recording technology, and more particularly to a method and system for providing perpendicular magnetic recording heads having wrap around shields.

BACKGROUND

Conventional perpendicular magnetic recording (PMR) heads may be unshielded or shielded. Although easier to fabricate and having higher write fields, unshielded heads have a low gradient field. Such a low gradient field results in less sharp transitions and lower signal to noise ratios, which are undesirable. Consequently, shielding is typically provided in conventional PMR heads.

Figure 1:
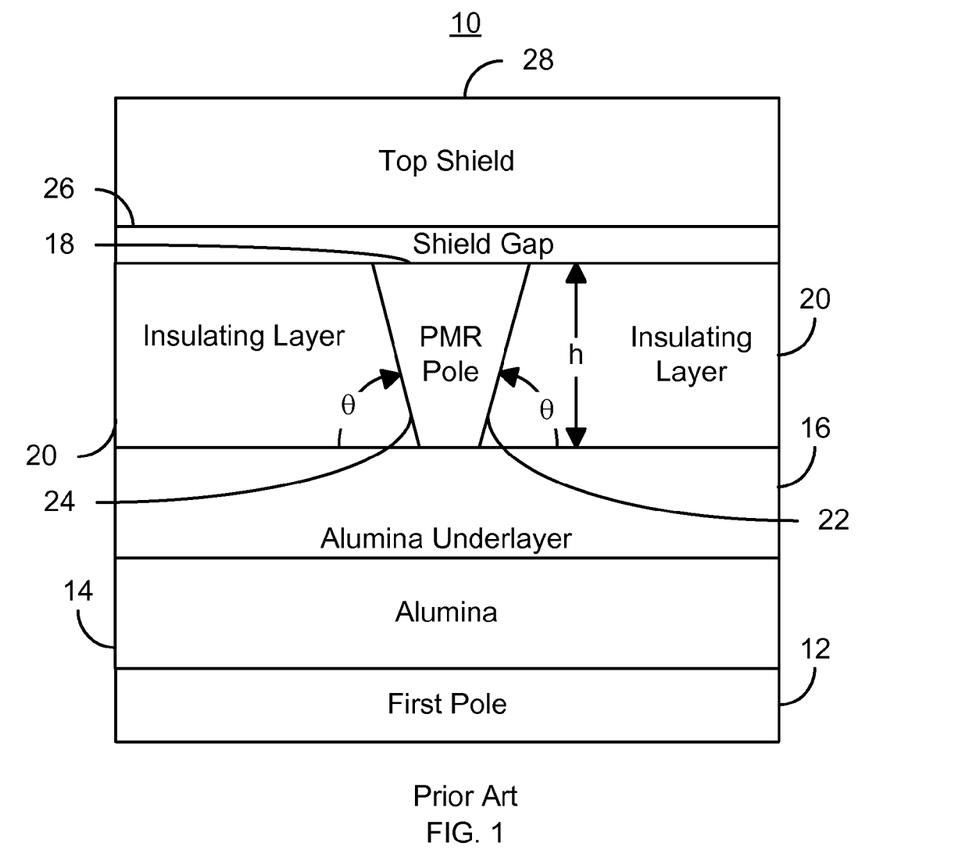
FIG. 1 is diagram depicting a conventional PMR head.

FIG. 1 depicts a portion of a conventional PMR head 10, as viewed from the air-bearing surface (ABS). The conventional PMR head 10 is a shielded head. The conventional PMR head 10 is typically part of a merged head including the PMR head 10 and a read head (not shown) and typically resides on a slider (not shown). For clarity, the conventional PMR head 10 is not drawn to scale.

The conventional PMR head 10 includes a conventional first pole 12, alumina insulating layer 14, alumina underlayer 16 that may be considered part of the alumina insulating layer 14, a conventional PMR pole 18 that typically includes a seed layer (not shown), insulating layer 20, shield gap 26, and top shield 28. Note that in certain other embodiments, the top shield 28 may also act as pole during writing using the conventional PMR head 10. The conventional PMR pole 18 is surrounded by insulating layer 20. Similarly, the top shield 28 is surrounded by another insulating layer (not shown). The conventional PMR pole 18 has sidewalls 22 and 24. In conventional applications, the height of the conventional PMR pole 18 is typically less than approximately three-tenths micrometer. The conventional PMR pole 18 also has a negative angle such that the top of the conventional PMR pole 18 is wider than the bottom of the conventional PMR pole 18. Stated differently, the angle θ of the sidewalls is less than ninety degrees in the conventional PMR pole 18 of FIG. 1. A pole having this height and shape is desirable for use in PMR applications.

Because the conventional PMR head 10 utilizes a top shield 28, the gradient field is improved. In addition, the net magnetic field from the conventional PMR head 10 is at an angle to the perpendicular direction. However, performance of the conventional PMR head 10 may still suffer due to stray side fields. Such stray side fields may cause side erasure of adjacent tracks. In addition, such a wider field profile may give rise to increased magnetic track width. Consequently, the reduced track pitch required for ultrahigh density recording may not be achieved.

Figure 2:
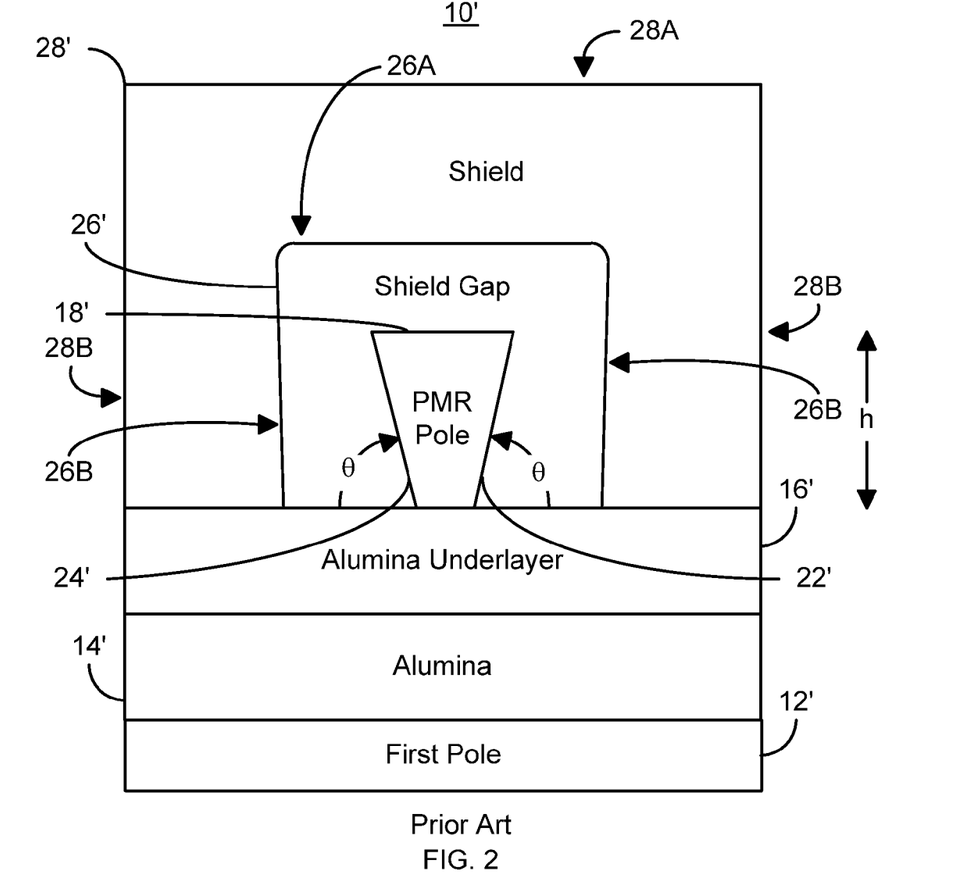
FIG. 2 is diagram depicting another conventional PMR head.

FIG. 2 depicts a portion of a conventional PMR head 10', as viewed from the air-bearing surface (ABS). The conventional PMR head 10' is a shielded head that includes side shields. The conventional PMR head 10' is typically part of a merged head including the PMR head 10 and a read head (not shown) and typically resides on a slider (not shown). For clarity, the conventional PMR head 10' is not drawn to scale.

The conventional PMR head 10' includes components that are analogous to those in the conventional PMR head 10. Such components are labeled similarly. Thus, the conventional PMR head 10' includes a conventional first pole 12', alumina insulating layer 14', alumina underlayer 16' that may be considered part of the alumina insulating layer 14', a conventional PMR pole 18' that typically includes a seed layer (not shown), shield gap 26', and shield 28'. The shield 28' includes top shield 28A and side shield 28B portions. Similarly, the shield gap 26' includes top gap 26A and side gap 26B portions.

Figure 3:
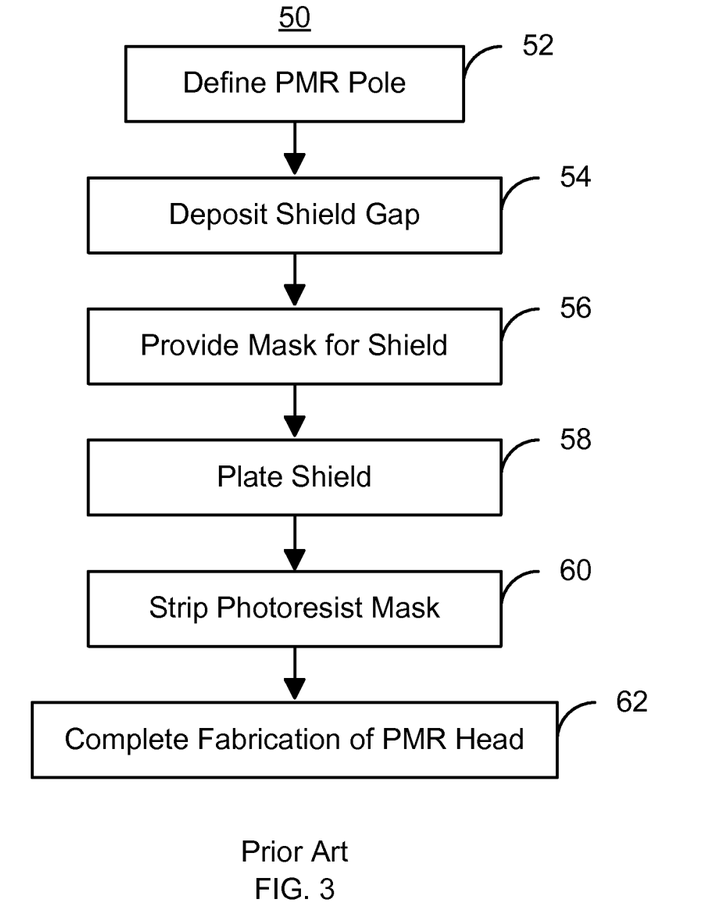
FIG. 3 is a flow chart depicting a conventional method for fabricating a PMR head having side shields.

FIG. 3 is a flow chart depicting a conventional method 50 for fabricating the conventional PMR head having a side shield. For simplicity, some steps are omitted. The conventional method 50 is described in the context of the conventional PMR head 10'. The conventional method 50 starts during formation of the PMR pole 18'. The PMR pole 18' is defined, via step 52. The shield gap 26' is deposited, via step 54. Thus, both the top gap 26A and the side gap 26B are deposited in step 54. A photoresist mask (not shown) for the shield 28' is provided, via step 56. The shield 28' is plated, via step 58. The photoresist mask used for the shield 28' is then removed, via step 60. Fabrication of the PMR head 10' is then completed, via step 62. Thus, the PMR head 10' may be formed.

Although the conventional method 50 may be used to fabricate the conventional PMR head 10', there are significant drawbacks. For example, the throat height (length perpendicular to the ABS) of the top shield portion 28A and the side shield portion 28B are the same. Similarly, the thicknesses of the top shield gap portion 26A and the side shield gap portions 26B are the same. This may adversely affect performance of the conventional PMR head 10'. In addition, the photolithography carried out for forming the resist masks in step 56 takes place on the pole 18'. As a result, the thickness of the mask may be uneven. Poor edge definition and location may thus result.

Accordingly, what is needed is an improved method for fabricating a PMR head.

SUMMARY

A method and system for providing a perpendicular magnetic recording head are disclosed. The method and system include forming a perpendicular magnetic recording pole having a bottom and a top wider than the bottom. The method and system also include depositing a side gap over the PMR pole and providing a side shield on the side gap. The method and system also include performing a planarization step that removes a portion of the side shield on the PMR pole. The method and system also include providing a top gap on the PMR pole. The top gap covers substantially only the PMR pole. The method and system further include providing a top shield.

DETAILED DESCRIPTION OF THE PREFERRED EMBODIMENTS

Figure 4:
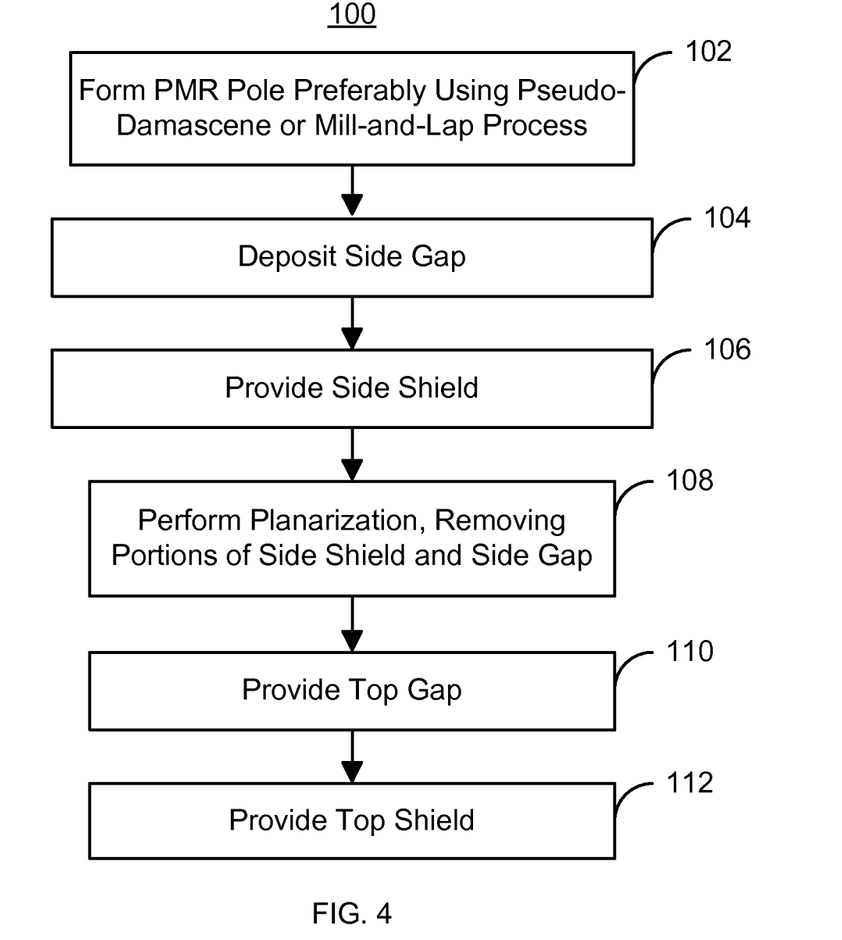
FIG. 4 is a flow chart depicting one embodiment of a method for fabricating a PMR head.
Figure 5A:
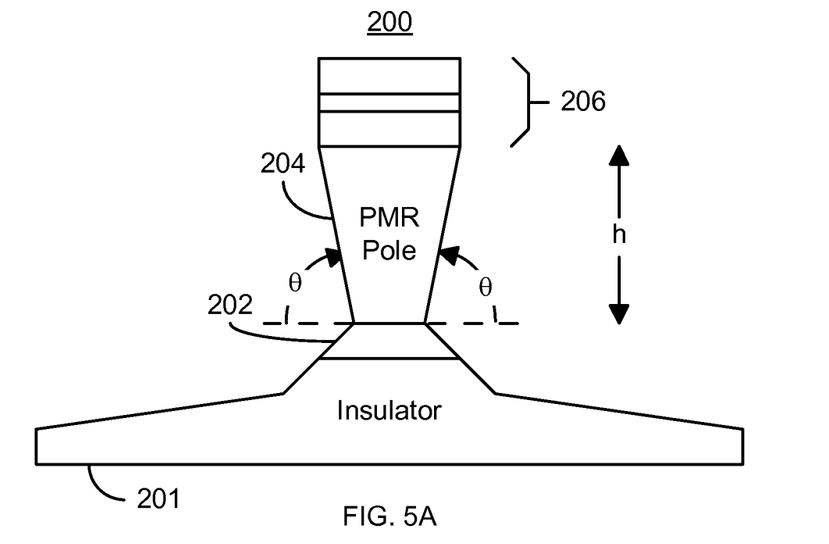
FIGS. 5A-5E are diagrams depicting the ABS views of an exemplary embodiment of a perpendicular magnetic recording head during fabrication.
Figure 5B:
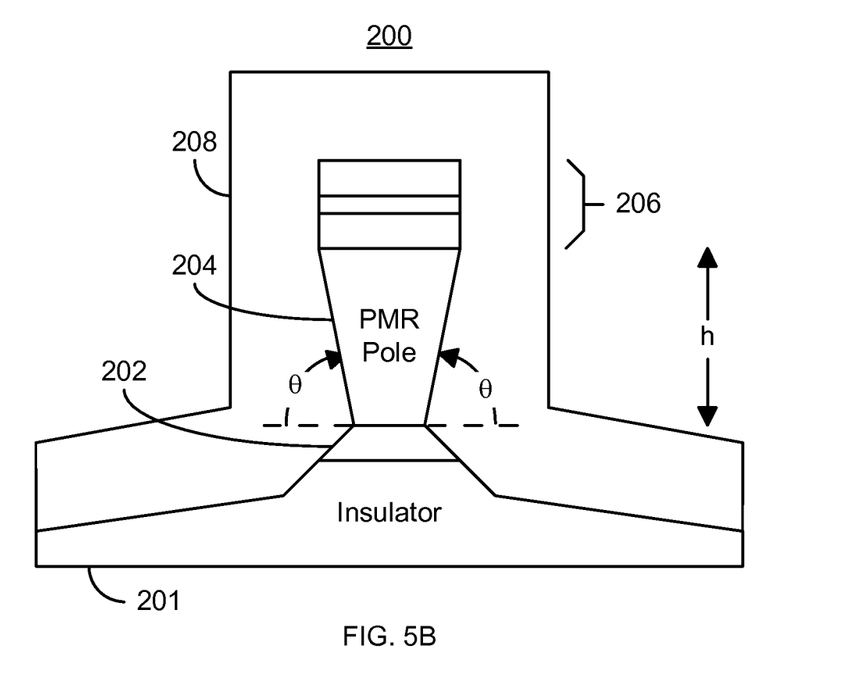
Figure 5C:
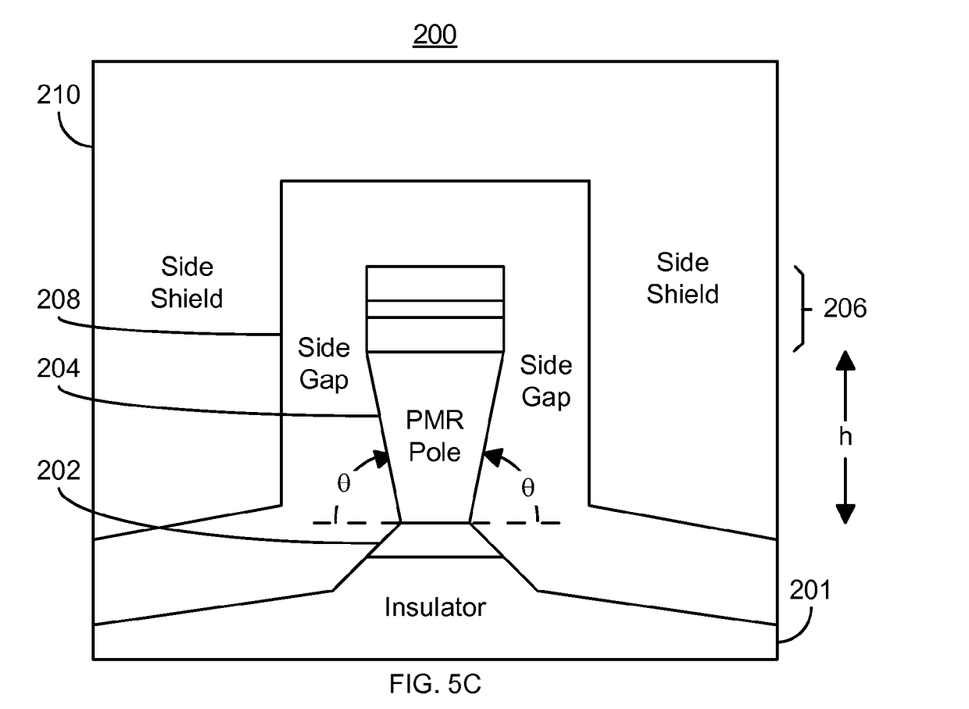
Figure 5D:
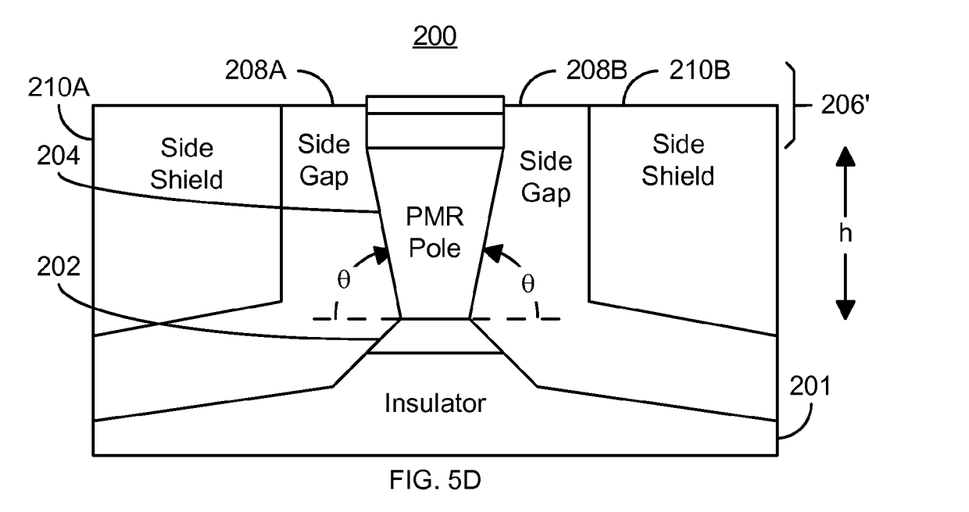
Figure 5E:
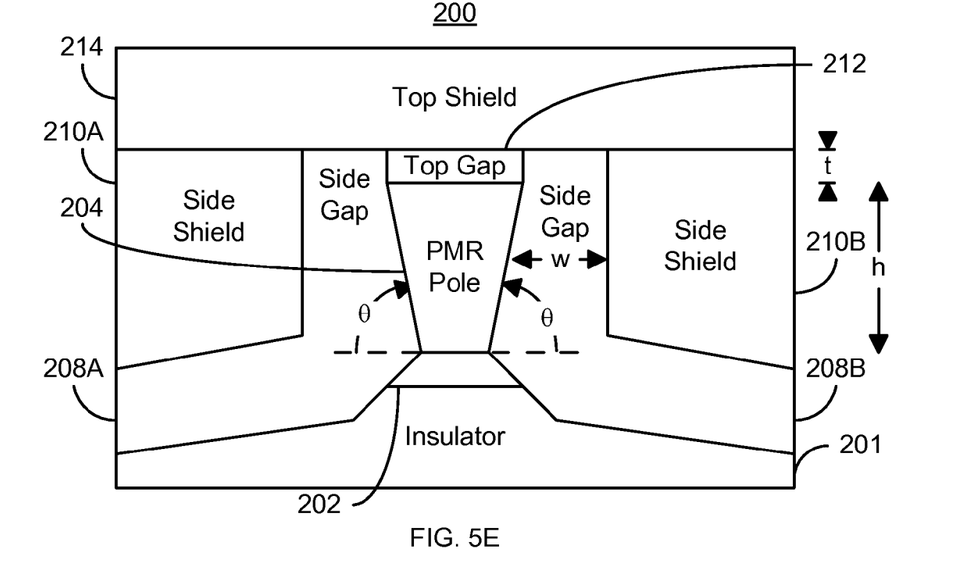

FIG. 4 is a flow chart depicting one embodiment of a method 100 for fabricating a PMR head. FIGS. 5A-5E are diagrams depicting the ABS views of an exemplary embodiment of a PMR head 200 during fabrication. Referring to FIGS. 4-5E, the method 100 is described in the context of the PMR head 200. For simplicity, some steps may be omitted. In addition, for clarity, the PMR head 200 is not drawn to scale. The PMR head 200 is preferably part of a merged head that also includes a read head (not shown) and resides on a slider (not shown). The method 100 also preferably commences after formation of a first pole and formation of layers that will reside under a second pole. For clarity, the PMR head 200 is not drawn to scale.

A PMR pole is formed, via step 102. In a preferred embodiment, the pole is formed using one of two processes. One process used is termed a pseudo-damascene process. In such a process, step 102 preferably includes depositing a layer of photoresist, providing a trench having a desired shape for the PMR pole in the photoresist, depositing the PMR pole in the trench, and removing the photoresist. The other such process is termed a mill-and-lap process. In the mill-and-lap process, material for the PMR pole is plated, a mask that covers the PMR pole is formed, and the PMR pole is defined (or trimmed) using the mask, preferably using an ion mill. In forming the PMR pole in either the pseudo damascene or the mill-and-lap process, multiple layers may be provided. For example seed and/or glue layers may be provided below the PMR pole. In the mill-and-lap process, a planarization stop layer may be provided on the PMR pole layer. In the pseudo-damascene process, a planarization stop layer is preferably not used. Instead, support structures spaced apart from the PMR pole may be used during a planarization. In addition, the PMR pole may be formed in step 102 on a metal underlayer, directly on an insulator, or on another layer. The PMR pole may be sputter deposited or electroplated using high moment materials. FIG. 5A depicts one embodiment of a PMR head 200 after step 102 is performed. The PMR head 200 includes an insulator 201 that preferably resides on a first pole (not shown). In the embodiment shown, a metal underlayer 202 is used. The PMR pole 204 is also depicted. The PMR pole 204 is preferably trapezoidal in shape, having a top that is wider than the bottom. Multiple layers 206 may also have been provided on the PMR pole 204. However, in another embodiment, the layers 206 may not be used.

A side gap is deposited on the PMR pole 204, via step 104. Examples of processes used for depositing the side gap may include physical vapor deposition, collimated physical vapor deposition, ion beam deposition, atomic layer deposition, and chemical vapor deposition. In a preferred embodiment, the side gap is blanket deposited on the PMR head 100. Also in a preferred embodiment, atomic layer deposition is used in step 104. The side gap is preferably at least five hundred Angstroms thick and no more than two thousand Angstroms thick. The thickness of the side gap deposited in step 104 may be selected based on the design requirements of the PMR head 200. FIG. 5B depicts the PMR head 200 after deposition of the side gap 208. The side gap 208 may be insulating. In a preferred embodiment, the side gap 208 includes at least one of aluminum oxide, silicon oxide, silicon nitride, and tantalum oxide. Depending upon the process used, the thickness of the side gap 208 on the side walls of the PMR pole 204 may be different than the thickness on the top (horizontal portion) of the PMR pole 204. For example, physical vapor deposition and collimated physical vapor deposition may result in a side gap 208 that is thinner on the sidewalls than on the top of the PMR pole 204. Ion beam deposition, atomic layer deposition, and chemical vapor deposition may result in a side gap 208 that has almost the same thickness on the top of the PMR pole 204 as the sidewalls of the PMR pole 204. In addition, if other deposition techniques are used, the side gap 208 may have a different shape. For example, if conformal deposition techniques, such as atomic layer deposition, are used, the side gap may conform to shape of the PMR pole 204. In such an embodiment, the side walls of the side gap may have a negative angle similar to θ.

A side shield is deposited on the PMR head, via step 106. Step 106 may also include depositing seed layers for the side shield and forming a mask having an aperture in the region of the PMR pole 204. In a preferred embodiment, the side shield is plated. However, in another embodiment, another deposition method may be used. FIG. 5C depicts the PMR head 200 after step 106 is performed. Thus, the side shield 210 is shown. The layer for the side shield 210 encapsulates the PMR pole 204.

A planarization is performed, via step 108. In a preferred embodiment, a chemical mechanical planarization (CMP) is used. The planarization step removes a portion of the side shield 210 and exposes the stack for the PMR pole 204. In addition, the top portion of the side gap 208 is removed. FIG. 5D depicts the PMR head 200 after step 108 has been performed. Thus, side shields 210A and 210B remain. In addition, the stack including the PMR pole 204 has been exposed. A portion of the side gaps 208A and 208B are also exposed. In the embodiment shown, a portion of the top layer(s) 206 has been removed, leaving the layers 206'. In another embodiment, the layers 206' may be completely removed. A substantially flat surface 211 is also provided by the planarization.

A top gap is provided on the PMR pole, via step 110. The top gap may be formed of the same material as the side gaps 210A and 210B or may be formed of another material. In some embodiments, step 110 is performed when the PMR pole 204 is formed. In such an embodiment, the top gap may be formed under the planarization layer described above with respect to the mill-and-lap process. However, in another embodiment, the top gap 110 may be formed at a different time than the PMR pole 204. The top shield is provided, via step 112. The top shield is preferably formed by plating the shield. In addition, a seed layer and an etch to remove a portion of the top shield may be performed in step 112. However, another deposition method could be used. Fabrication of the PMR head 200 may then be completed, via step 114. FIG. 5E depicts the PMR head 200 after step 112 has been performed. Thus, the top gap 212 and the top shield 214 have been provided. In the embodiment shown, the top gap 212 covers substantially only the PMR pole 204. In the embodiment shown in FIG. 5E, the thickness, t, of the top gap 212 is different from the width, w, of the side gaps 208A and 208B. In one embodiment, the width, w, is at least twice the thickness, t. For example, in one embodiment, the side gaps 208A and 208B may be more than one hundred nanometers, while the top shield gap 212 may be fifty nanometers or less. In another embodiment, the width, w, is at least three times the thickness, t.

Thus, the method 100 may be used to provide the PMR head 200. Because they are formed separately, the top gap 212 and the side gaps 208A and 208B can be configured independently. Thus, the width of side gaps 208A and 208B can differ from the thickness of the top gap 212. More particularly, the width of the side gaps 208A and 208B may, for example, be two to three times the thickness of the top gap 212. Consequently, better magnetic performance can be achieved. In addition, because the planarization performed in step 108 results in a flat topology, the top shield 212 is provided on a relatively flat topology. Consequently, better edge definition and edge location control may be provided. In addition, the side shields 210A and 210B and the top shield 214 may be configured independently. As a result, the throat height (perpendicular to the page in FIGS. 5A-5E) of the top shield 214 may be set independently from the throat height of the side shields 210A and 210B. For example, the throat height of the top shield 214 may be set to 0.2 μm or less, while the throat height of the side shields 210A and 210B may be larger. Consequently, the desired field strength, gradient, and angle may be achieved while providing side shields for reducing inadvertent side erasure of adjacent tracks. Consequently, a reduced track pitch for ultrahigh density recording may be achieved. Furthermore, the method 100 may be relatively easily incorporated into existing methods for fabricating PMR heads. Thus, the benefits of the PMR head 200 may be achieved without radically altering existing fabrication methods.

Figure 6:
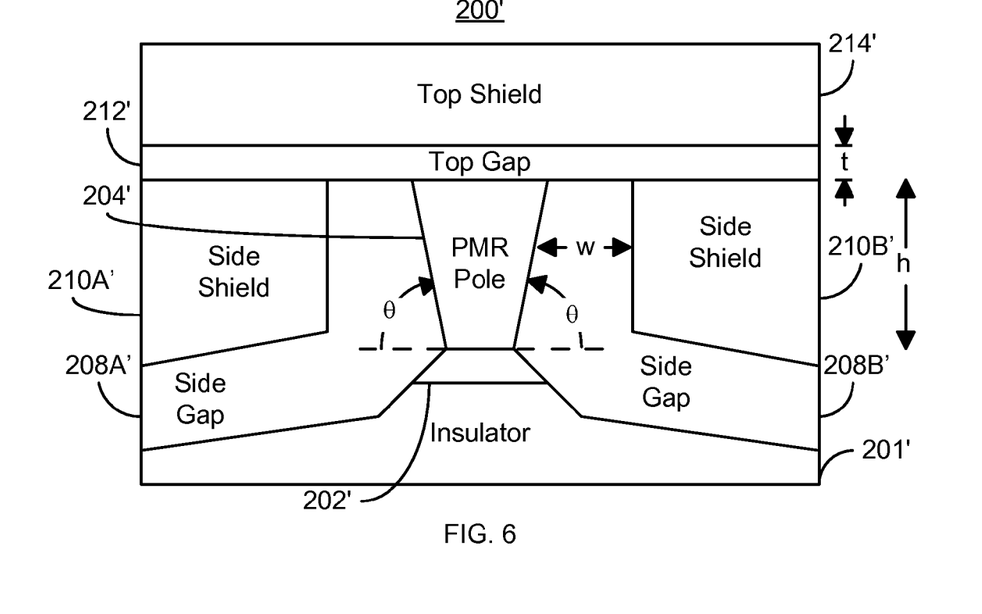
FIG. 6 is a diagram depicting the ABS views of another exemplary embodiment of a perpendicular magnetic recording head during fabrication.

FIG. 6 is a diagram depicting the ABS views of another exemplary embodiment of a PMR head 200' during fabrication. In addition, for clarity, the PMR head 200' is not drawn to scale. The PMR head 200' is preferably formed using the method 100. In addition, the PMR head 200' is analogous to the PMR head 200 and, therefore, has components that are labeled similarly. The PMR head 200' thus includes a PMR pole 204' that may be formed on a metal underlayer 202' and underlying insulator 201', side gaps 208A' and 208B', side shields 210A' and 210B', top gap 212' and top shield 214'. The PMR head 200' may also include additional layers 206'.

The top gap 212' in the PMR head 200' is fabricated in step 110 of the method 100. However, for the PMR head 200', the top gap 212' is configured to separate the top shield 214' from the side shields 210A' and 210B'. However, for the PMR head 200', the side gaps 208A' and 208B' can still be configured separately from the top gap 212'. Similarly, the side shields 210A' and 210B' may be configured separately. In addition, the topology of the PMR head 200' after formation of the top gap 212' and in preparation for providing the top shield 214' is quite flat. Consequently, the benefits of the PMR head 200 may also be achieved for the PMR head 200'.

Figure 7:
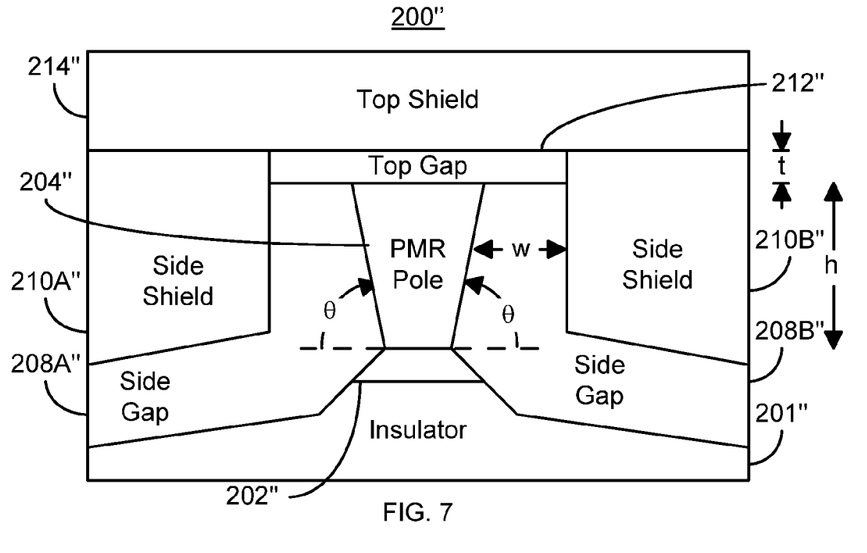
FIG. 7 is a diagram depicting the ABS views of another exemplary embodiment of a perpendicular magnetic recording head during fabrication.

FIG. 7 is a diagram depicting the ABS views of another exemplary embodiment of a PMR head 200" during fabrication. In addition, for clarity, the PMR head 200" is not drawn to scale. The PMR head 200" is preferably formed using the method 100. In addition, the PMR head 200" is analogous to the PMR head 200 and, therefore, has components that are labeled similarly. The PMR head 200" thus includes a PMR pole 204" that may be formed on a metal underlayer 202" and underlying insulator 201", side gaps 208A" and 208B", side shields 210A" and 210B", top gap 212" and top shield 214". The PMR head 200" may also include additional layers 206".

The top gap 212" in the PMR head 200" is fabricated in step 110 of the method 100. However, for the PMR head 200", the top gap 212" is configured extend over the side gaps 208A" and 208B" without separating the top shield 214" from the side shields 210A" and 210B". For the PMR head 200", the side gaps 208A" and 208B" can still be configured separately from the top gap 212". Similarly, the side shields 210A" and 210B" may be configured separately. In addition, the topology of the PMR head 200" after formation of the top gap 212" and in preparation for providing the top shield 214" is quite flat. Consequently, the benefits of the PMR heads 200 and 200' may also be achieved for the PMR head 200".

Figure 8:
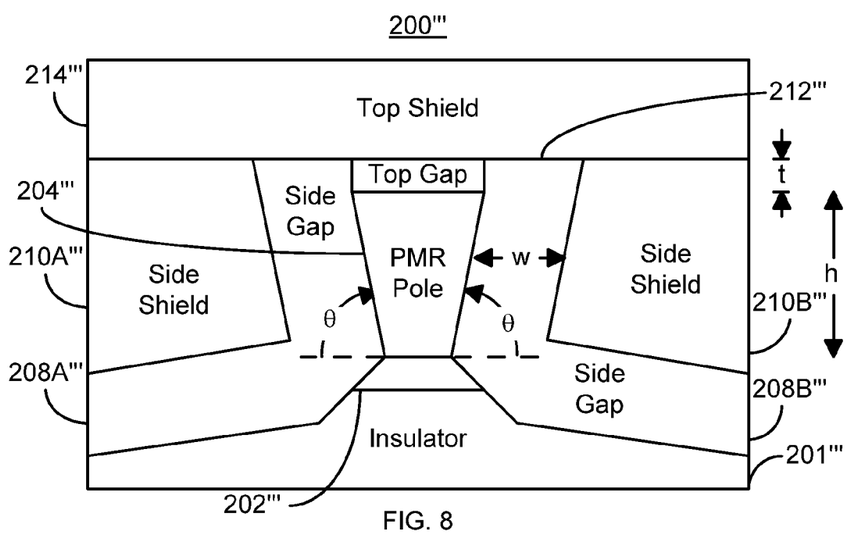
FIG. 8 is a diagram depicting the ABS views of another exemplary embodiment of a perpendicular magnetic recording head during fabrication.

FIG. 8 is a diagram depicting the ABS views of another exemplary embodiment of a PMR head 200''' during fabrication. For clarity, the PMR head 200''' is not drawn to scale. The PMR head 200''' is preferably formed using the method 100. In addition, the PMR head 200''' is analogous to the PMR head 200 and, therefore, has components that are labeled similarly. The PMR head 200''' thus includes a PMR pole 204''' that may be formed on a metal underlayer 202' and underlying insulator 201''', side gaps 208A''' and 208B''', side shields 210A' and 210B''', top gap 212' and top shield 214'''. The PMR head 200' may also include additional layers 206'.

The side gaps 208A''' and 208B''' in the PMR head 200' are deposited in step 104 of the method 100. For the PMR head 200', a conformal deposition technique, such as atomic layer deposition, is used in step 104. Consequently, the sidewalls of the side gaps 208A''' and 208B' have a negative angle that is similar to that of the PMR pole 204'''. The side gaps 208A''' and 208B''' can still be configured separately from the top gap 212'''. Similarly, the side shields 210A' and 210B''' may be configured separately. In addition, the topology of the PMR head 200''' after formation of the top gap 212' and in preparation for providing the top shield 214''' is quite flat. Consequently, the benefits of the PMR heads 200, 200', and 200" may also be achieved for the PMR head 200'.

Thus, using the method 100, fabrication, performance, and reliability of PMR transducers 200, 200', 200", and 200''' may be improved.

We claim:

1. A perpendicular magnetic recording (PMR) head including an air-bearing surface (ABS) and comprising:
   a PMR pole having at least one side, a bottom, and a top wider than the bottom;
   at least one side gap encapsulating the at least one side of the PMR pole, the at least one side gap having at least one width;
   at least one side shield, the at least one side gap residing between the PMR pole and the at least one side shield;
   a top gap on the PMR pole, the top gap having a thickness, a ratio of the at least one width to the thickness being greater than one; and
   a top shield, a portion of the top gap residing between at least a portion of the top shield and the at least one side shield;
   wherein the at least one side shield has a side shield throat height in a direction perpendicular to the ABS, the top shield has a top shield throat height in the direction, and the side shield throat height being different from the top shield throat height.

2. The PMR head of claim 1 wherein the ratio is at least two.

3. The PMR head of claim 1 wherein the ratio is at least three.

4. The PMR head of claim 1 further comprising:
a metal underlayer under the PMR pole; and
wherein the PMR pole includes at least one magnetic pole layer.

5. The PMR head claim 1 wherein the side gap further includes at least one of an aluminum oxide layer, a silicon oxide layer, a silicon nitride layer, and a tantalum oxide layer.

6. A perpendicular magnetic recording (PMR) head comprising:
- a PMR pole having at least one side, a bottom, and a top wider than the bottom, the PMR pole including a metal underlayer and at least one magnetic layer;
- at least one side gap encapsulating the at least one side of the PMR pole, the at least one side gap having at least one width;
- at least one side shield having a side shield throat height, the at least one side gap residing between the PMR pole and the at least one side shield;
- a top gap on the PMR pole, the top gap having a thickness, a ratio of the at least one width to the thickness being greater than two; and
- a top shield having a top shield throat height, the side shield throat height being different from the top shield throat height, a portion of the top gap residing between at least a portion of the top shield and the at least one side shield;
- wherein the at least one side shield has a side shield throat height in a direction perpendicular to the ABS, the top shield has a top shield throat height in the direction, and the side shield throat height being different from the top shield throat height.

\* \* \* \* \*